United States Patent [19]

Bauer

[11] Patent Number: 4,818,156
[45] Date of Patent: Apr. 4, 1989

[54] TOOL FOR MAKING ROUGHING AND FINISHING CUTS IN A WORKPIECE

[76] Inventor: Walter Bauer, Weidenstrasse 15, 7403 Ammerbuch 1, Fed. Rep. of Germany

[21] Appl. No.: 208,047

[22] Filed: Jun. 17, 1988

[30] Foreign Application Priority Data

Jun. 23, 1987 [DE] Fed. Rep. of Germany ....... 3720630

[51] Int. Cl.⁴ ............................................. B23B 51/00
[52] U.S. Cl. ................................... 408/150; 408/188; 408/200; 408/223; 408/227
[58] Field of Search .................... 408/27, 30, 117, 118, 408/119, 146, 147, 150, 151, 154, 156, 187, 188, 199, 200, 223, 227, 238

[56] References Cited

U.S. PATENT DOCUMENTS 1,547,108 7/1925 Ellis ...................................... 408/154

FOREIGN PATENT DOCUMENTS

| 1402911 | 11/1968 | Fed. Rep. of Germany . | |
|---|---|---|---|
| 2715234 | 10/1977 | Fed. Rep. of Germany . | |
| 223086 | 6/1985 | German Democratic Rep. | 408/146 |
| 250275 | 10/1987 | German Democratic Rep. | 408/199 |
| 607665 | 5/1978 | U.S.S.R. | 408/150 |

Primary Examiner—Gil Weidenfeld
Assistant Examiner—Daniel W. Howell
Attorney, Agent, or Firm—Burns, Doane, Swecker & Mathis

[57] ABSTRACT

A drill for performing a roughing cut in a workpiece as the drill is advanced, and performing a finishing cut as the drill is retracted. A blade carrier is mounted eccentrically on the drill to be movable between first and second positions. In the first position, the blade is located for a roughing cut. In the second position, the blade is shifted radially for a finishing cut. A spring biases the carrier toward the second position and yields when the carrier moves to the first position. The spring bias is too weak to overcome reaction forces acting on the blade during a roughing cut, wherein the roughing cut reaction forces cause the carrier to be shifted to the first (roughing cut) position. The spring bias is strong enough to overcome the weaker reaction forces occurring during a finishing cut, so that the carrier is automatically shifted to the second (finishing cut) position when the drill is withdrawn through the workpiece. Thus, the blade is automatically shifted from the roughing-cut position to the finishing-cut in response to the initiation of a movement of the tool in a direction of withdrawal through the roughly cut hole.

12 Claims, 5 Drawing Sheets

TOOL FOR MAKING ROUGHING AND FINISHING CUTS IN A WORKPIECE

BACKGROUND OF THE INVENTION

The invention concerns a tool for the cutting of workpieces, especially by rotary drilling.

Tools of this type are known (e.g., see DE-OS No. 14 02 911) wherein the cutting blade carrying out the operation is located eccentrically relative to a rotating axle of the drill chuck. The chuck is rotated and advanced relative to the workpiece to roughly cut a hole. Thereafter, the chuck is retracted through the roughly cut hole to make a finishing cut. The eccentric is pressed by a spring against a stop, against which it is abutting during the advance movement of the drilling tool during the roughing cut. Movement of the eccentric against the stop is effected initially by the spring and then during a roughing cut by the torque acting additionally on the eccentric. When the roughing cut is completed, the eccentric may be rotated against the bias of the spring by means of an adjusting spindle guided in the drill chuck, whereby the cutting edge is displaced to revolve at a larger diameter around the axle of the drill chuck. During the subsequent retraction of the drilling tool through the roughly cut hole, a finish cut may be effected with that larger diameter, while the formation of a helical groove in the finished borehole by an edge of the cutting blade is prevented.

In other prior art cutters (DE-OS No. 27 15 234) it is known to reposition the cutting edge of a drilling tool after the completion of the initial cut into a radial retracted position in which no contact of the cutting edge with the finished internal surface of the bore is possible during the retraction of the drill through the hole. However, in order to make a finishing cut the tool must be reset and re-advanced through the bore. This is expensive.

It is an object of the invention to provide a cutting tool for peripheral cutting machining of the aforementioned type, so that both the advance and return motions of the tool may be used for cutting, but without the need for a mechanical or powered adjusting device for changing the blade cutting diameter.

SUMMARY OF THE INVENTION

The invention is based on the discovery that different resultant cutting forces appear in rough and finish machining and that these forces differ by a large order of magnitude. The invention utilizes these different forces and the torques generated by them to obtain an automatic adjustment of the cutting edge of a drilling tool, which therefore is capable of carrying out automatically the roughing cut and, during drill retraction, a finish cut. The invention is also applicable to a tool arranged for the machining of cylindrical outer surfaces rather than inner surfaces.

In accordance with the present invention, the tool comprises a drill chuck rotatable about a first axis, and a blade carrier mounted on the chuck for rotation therewith during a cutting phase. The carrier is rotatable relative to the chuck about an eccentric second axis during a blade-adjustment phase, such that the carrier is rotatable relative to the chuck between first and second positions. In the first position, a blade mounted on the carrier is disposed at a first distance from the first axis for effecting a roughing cut as the tool is advanced relative to the workpiece during which the carrier is acted upon by a first reaction torque. In the second position, the blade is disposed at a second distance from the first axis for effecting a finishing cut as the tool is retracted through the roughly cut hole during which the carrier is acted upon by a second reaction torque weaker than the first reaction torque. A spring on the chuck biases the carrier away from the first position toward the second position with a biasing torque greater than the second reaction torque but less than the first reaction torque, whereby the carrier is automatically spring biased to the second position in response to retraction of the tool through the roughly cut hole during a finishing cut.

BRIEF DESCRIPTION OF THE DRAWINGS

In the drawing certain advantageous embodiments of the invention are illustrated, which subsequently are described. In the drawing.

DETAILED DESCRIPTION OF THE PREFERRED EMBODIMENTS

Figure 1:
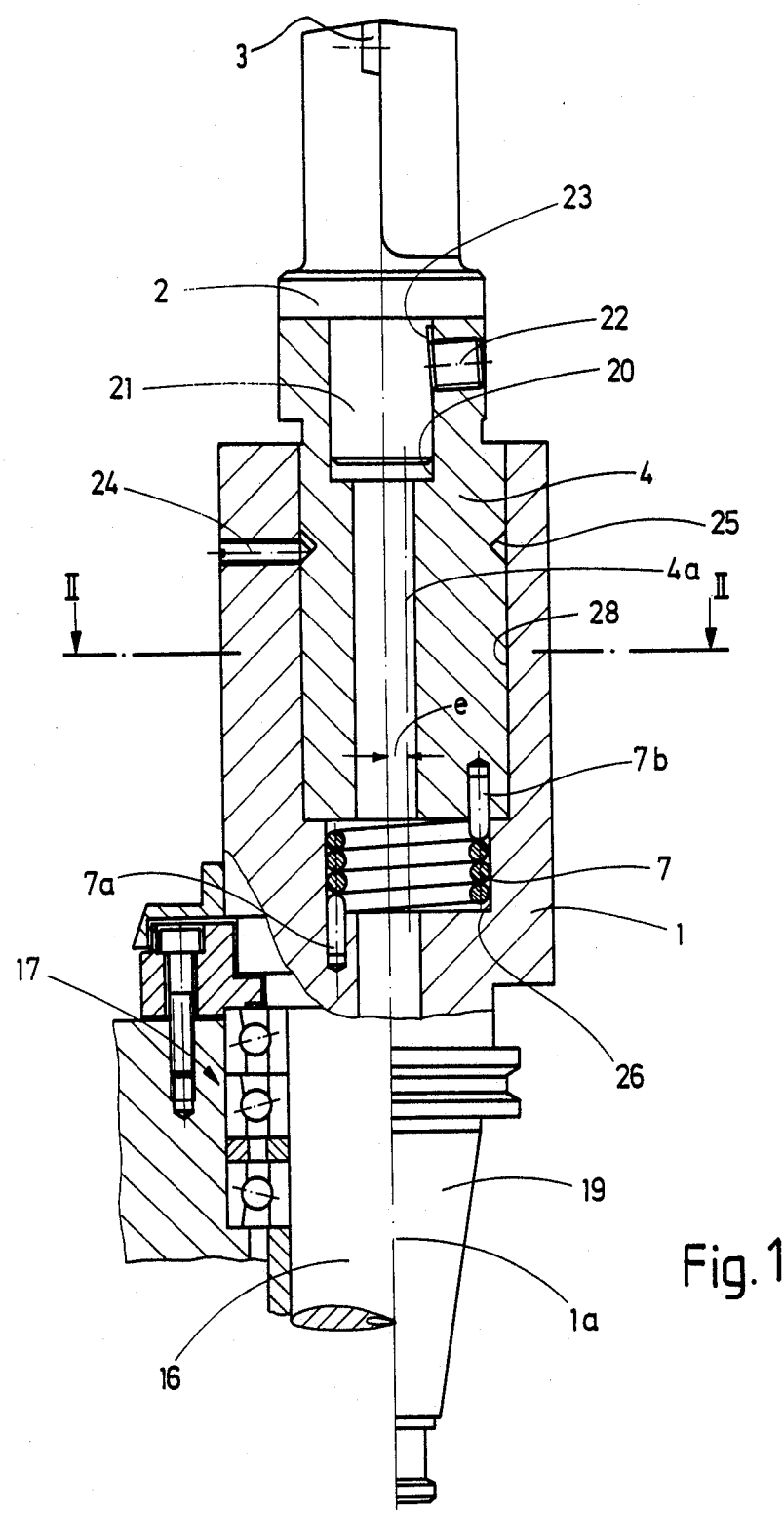
FIG. 1 is a schematic longitudinal section through a drill chuck according to the invention, wherein the drilling tool is mounted on an eccentric within the drill chuck.
Figure 2:
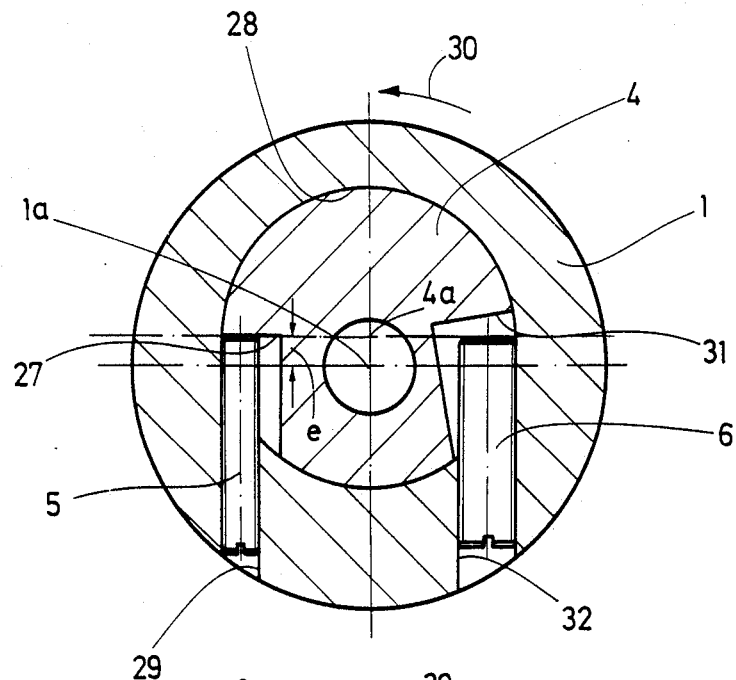
FIG. 2 is a cross-section through FIG. 1 taken on the line II—II.

FIGS. 1 and 2 show a drill chuck 1, which in a known manner, as seen in the left hand half of FIG. 1, is connected by means of a cylindrical shaft 16 with a drive (not shown), the shaft 16 being mounted in a bearing 17 of a processing machine (not shown). Alternatively, the drill chuck 1 may be equipped, as shown in the right hand half of FIG. 1, with a mounting cone, which may be fastened in a conventional manner, to a corresponding holder of a processing machine.

In a bore 28 of the drill chuck 1 an eccentric blade carrier in the form of an eccentric sleeve 4 is located, the center axis 4a of which sleeve is parallel to the axis of rotation 1a of the drill chuck 1, but is offset eccentrically by a distance E relative to that axis 1a. The eccentric sleeve 4 includes a bore which, in a known fashion, may be utilized to conduct a coolant to the working tool 2. A drilling tool 2, which may be of a commercially available type, is held in a receiver bore 20 of the sleeve 4 by a cylindrical stud 21 to which a clamping screw 22 is applied. The screw abuts against a surface 23 of the stud 21 which surface is slightly inclined relative to the axis of rotation 1a. A cutting blade 3 in the form of an insert is mounted stationarily on the end of the drilling tool 2 facing away from the stud 21. Instead of one blade, two or more blades may be provided as discussed later below.

The eccentric sleeve 4 is held axially within the drill chuck 1 by a locking screw 24 which engages a circumferential groove 25 in the eccentric sleeve. A helical torsion spring 7 has its ends 7a, 7b held fixedly in the drill chuck 1 and sleeve 4, respectively. The remainder of the spring is seated in a recess 26 of the chuck 1. The helical spring 7 is designed and arranged so that, as seen in FIG. 2, it biases the eccentric sleeve 4 in the counterclockwise direction and presses a first contact surface 27 of the sleeve against a stop screw 5 protruding inside the bore 28. The stop screw 5 passes from the outside through a threaded bore 29 in the drill chuck 1. The spring 7 biases the eccentric sleeve 4 in the driving direction 30 of the tool, i.e., the counterclockwise direction of FIG. 2, against the stop screw 5. The eccentric sleeve 4 has a second contact surface 31 capable of coming into contact with a second stop screw 6, which passes through a threaded bore 32 in the drill chuck 1. This second stop screw 6 has a larger diameter than the stop screw 5 so that it can absorb larger forces, for reasons discussed hereinafter.

Figure 3:
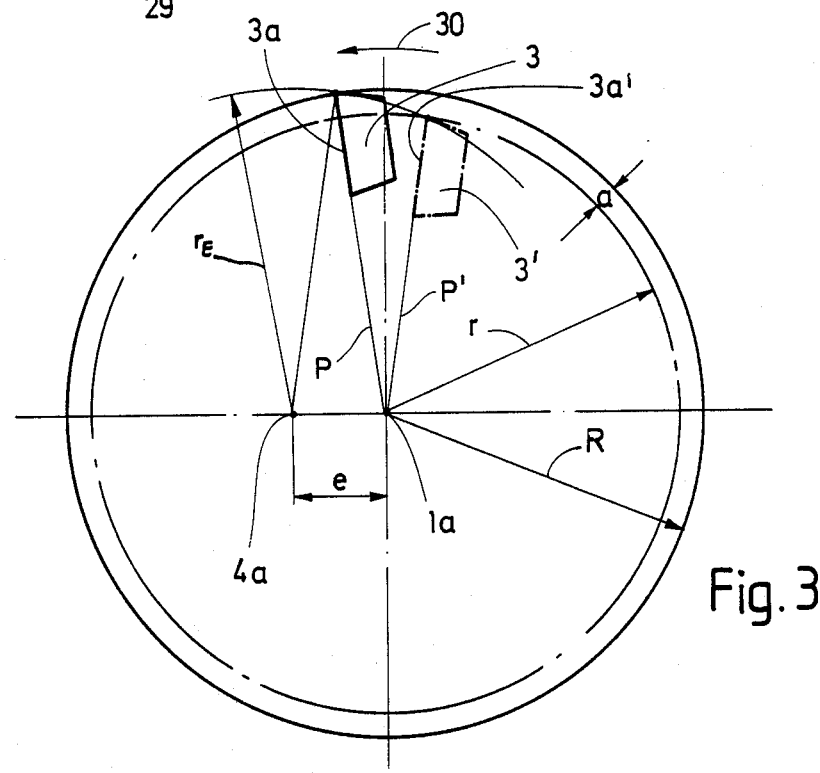
FIG. 3 is a schematic view of the different positions of the cutting blade obtainable by the rotation of the eccentric.

As seen in FIG. 3, during the rotation of the tool in the direction of the arrow 30, i.e., in the counterclockwise direction, the cutting blade 3, fixedly connected with the eccentric sleeve 4, contacts a workpiece and is acted upon by a reaction force directed counter to the direction of rotation 30. That force urges the eccentric sleeve around its axle 4a in the clockwise direction against the bias of spring 7. Such a rotation would move the cutting blade 3 from its position indicated by a solid line in FIG. 3, in which its outermost cutting edge is located on a radius R, into a broken-line position 3', in which its outer cutting edge is on a smaller radius r. The cutting blade 3 is located on the eccentric 4 so that its surface 3a facing toward the direction of cutting 30 is, in both terminal positions (i.e., in the positions 3 and 3'), oriented in substantially radial planes P, P'. Slight deviations of the surface 3a, 3a' relative to the radial planes can be tolerated in actual practice.

The cutting edge of blade 3 is in the solid line position of FIG. 3 when the sleeve 4 is in the position shown in FIG. 2. In that position, the cutting edge of the cutting blade 3 lies on the larger radius R, corresponding to the working radius for a finishing operation. The broken line position 3' of the cutting blade 3 is attained when the eccentric sleeve 4 is displaced clockwise from its position shown in FIG. 2 to a position wherein the second contact surface 31 abuts the stop screw 7. This position corresponds to a roughing operation of the tool.

The helical spring 7 is of such strength that the spring is only able to produce a biasing torque on the sleeve which is at best significantly weaker than the reaction torque occurring during a roughing operation, i.e., the biasing torque acting in the counterclockwise direction is weaker than the reaction torque acting against the blade 3 in the clockwise direction. That reaction torque is a function of the reaction force acting on the cutting edge 3 and the radial distance from the axle of rotation 1a, approximately taken as the radius R. But on the other hand, the strength of the helical spring 7 is great enough so that the resulting biasing torque in the counterclockwise direction, is significantly larger than the reaction torque generated during the finishing operation which takes place upon the radial retraction of the blade to the broken line position of FIG. 3. The finishing reaction torque is smaller, as explained below, by several orders of magnitude than the roughing reaction torque in view of the substantially smaller chip thickness. Therefore, after completion of the roughing operation (i.e., the cutting of larger chips), during which the eccentric sleeve 4 abuts the stop screw 6 and the cutting blade is in the broken-line position 3', the sleeve is automatically rotated back into the finishing position shown in FIG. 2 by the biasing torque of the helical spring, even as the tool continues to rotate. The cutting blade 3 is then located on the larger radius R and carries out the finishing operation during the retraction of the tool from the cut hole without the need for outside interference or manipulation to reposition the blade.

As an example illustrating the forces involved, a calculation of the cutting torques will be presented for the drilling of a hole in cast steel (GS 52) having a precast hole of 23 mm diameter, using a single edge tool (drill rod). The hole with the diameter of 23 mm is to be rough drilled to a diameter of 29.6 mm during the drill advance and then finished to a diameter of 30 mm during the return stroke of the tool. The center axes of the rotating motion (the axle of rotation 1a of the drill chuck 1) and of the pivoting motion of the eccentric (the eccentric axle 4a of the eccentric sleeve 4) should be spaced only a short distance from each other (e=3 mm) and the cutting arrangement should correspond in principle to that of FIG. 3. The following generally valid formulas may be used for the calculation of the cutting force, which are approximate only, as only a part of the parameters can be determined:

$$F_c = k_c \cdot A$$

$$A = s \cdot a$$

$$M_D = r_E \cdot F_c = r_E \cdot k_c \cdot s \cdot a$$

Notation and units used

| Value | Unit | Designation |
|---|---|---|
| $F_c$ | N | Cutting force |
| $k_c$ | N/mm$^2$ | Specific cutting force |
| A | mm$^2$ | Chip section |
| s | mm | Advance per revolution |
| a | mm | Cutting depth |
| $M_D$ | Nm | Torque relative to the axis of the eccentric |
| $r_E$ | mm | Radial distance of the center of the chip cross section from the center of the eccentric |

Applied to the present example, the following is true for rough cutting:

$$r_E = (29.6 \text{ mm})/2 - [(29.6 - 23) \text{ mm}]/4 = 13.15 \text{ mm}$$

$$k_C \text{ (rough cutting)} = 2320 \text{ N/mm}^2$$

$$s = 0.2 \text{ mm/U}$$

$$a = 3.3 \text{ mm}$$

$$M_D \text{ (rough cutting)} = 13.15 \text{ mm} \cdot 2320 \text{ N/mm}^2 \cdot 0.2 \text{ mm} \cdot 3.3 \text{ mm}$$
$$= 20.135 \text{ Nm}$$

Applied to the present example, the following is valid for finish cutting:

$$r_E = (30 \text{ mm})/2 - [(30 - 29.6) \text{ mm}]/4 = 14.9 \text{ mm}$$

$$k_C \text{ (finish cutting)} = 2600 \text{ N/mm}^2$$

$$s = 0.1 \text{ mm/U}$$

$$a = 0.2 \text{ mm}$$

$$M_D \text{ (finish cutting)} = 14.9 \text{ mm} \cdot 2600 \text{ N/mm}^2 \cdot 0.1 \text{ mm} \cdot 0.2 \text{ mm}$$

$$= 0.775 \text{ Nm}$$

COMPARISON

[$M_D$ (rough cutting)]/[$M_D$ (finish cutting)] = (20.135 Nm)/(0.775 Nm) = 26

When the spring produces a biasing torque of about 4 Nm, the reaction torque for finish cutting amounts to less than one-fifth of the biasing torque, and the reaction torque for rough cutting amounts to more than five times the biasing torque, i.e., there is always a clear difference.

It follows from this comparison that the different reaction torques used according to the invention differ by more than 20 times. The biasing force may thus be chosen so that the automatic switching process from rough to finish cutting is actuated automatically.

In operation, it will be appreciated that as the tool approaches a pre-cast hole in a workpiece in preparation of a roughing cut, the blade will be disposed in its radially outermost position 3 by the urging of the spring 7 and thus will project radially beyond the diameter of the pre-cast hole by a distance equal to the sum of the anticipated roughing and finishing cuts. When the blade 3 initially engages the workpiece, the reaction forces will be large, causing the blade to be pushed radially inwardly (via rotation of the rotor 4) against the bias of spring 7 until such radial movement is halted by the stop 6. The distance of such radial inward movement equals the thickness of the finishing cut which will be produced later (when the tool is withdrawn through the hole). However, the blade still extends radially beyond the diameter of the hole by a distance equal to the thickness of the roughing cut which is about to be carried out. A roughing cut then proceeds as the tool is advanced. Thereafter, when the roughing cut is done and the tool begins to be withdrawn for a finishing cut, the blade initially faces the roughly cut hole of a diameter greater than the diameter of the pre-cast hole encountered during the roughing cut. Hence, the reaction forces to which the blade is subjected are reduced, whereupon the spring bias is able to automatically displace the blade radially outwardly (via rotation of the rotor 4) to the finishing position, since the thickness to be cut during the finishing step is less than the thickness cut during the roughing step.

In place of the drilling tool 2 shown in FIG. 1 wherein a cutting edge acts on the inside of a workpiece, a bell shaped tool may also be provided for the working of cylindrical outer surfaces of a workpiece. The cutting edge must be located so that during the eccentric pivoting process to finish cutting, it pivots to a smaller radius.

Figure 4:
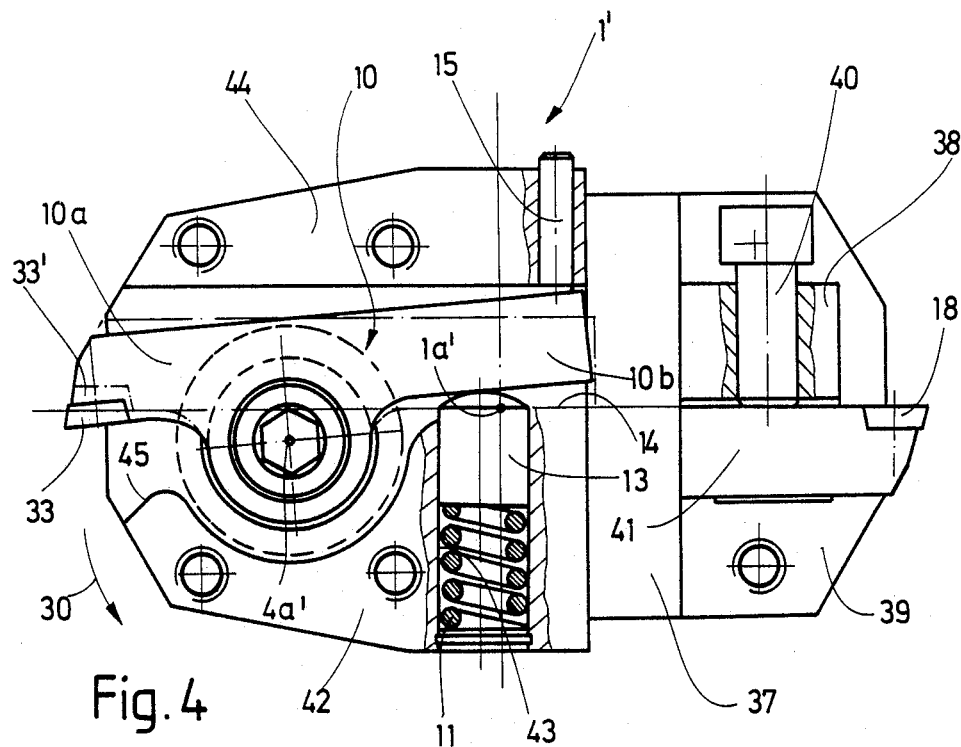
FIG. 4 is a schematic front elevational view of a bridge tool according to the invention, as viewed in the direction of the arrow IV of FIG. 5.
Figure 5:
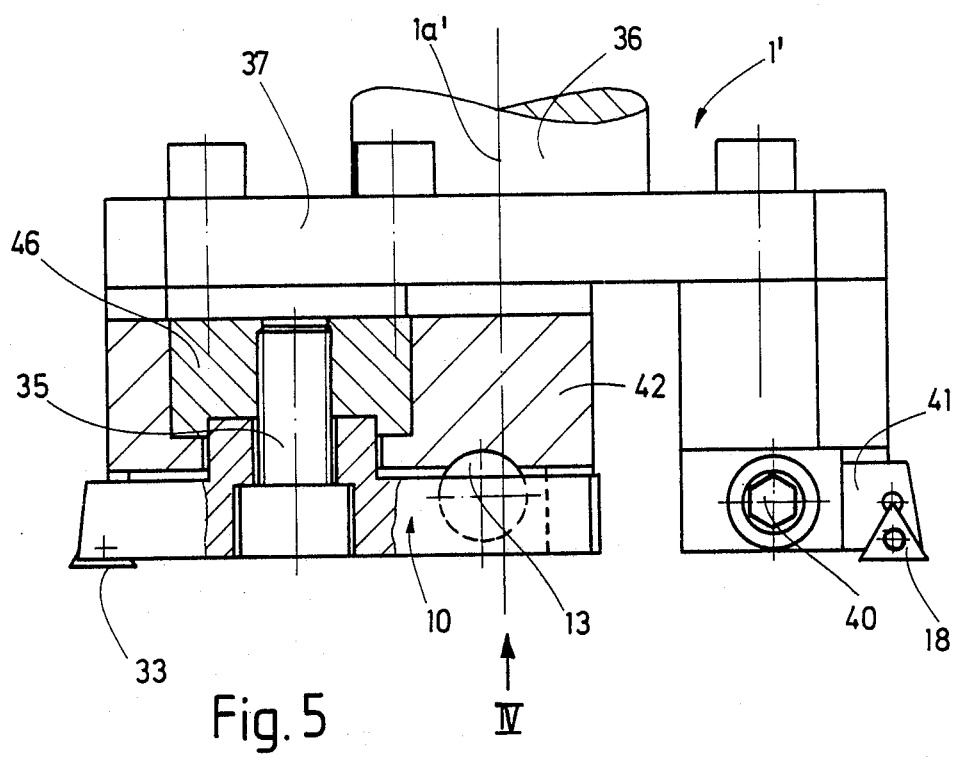
FIG. 5 is a schematic lateral elevation of the tool of FIG. 4, in a partial section.
Figure 6:
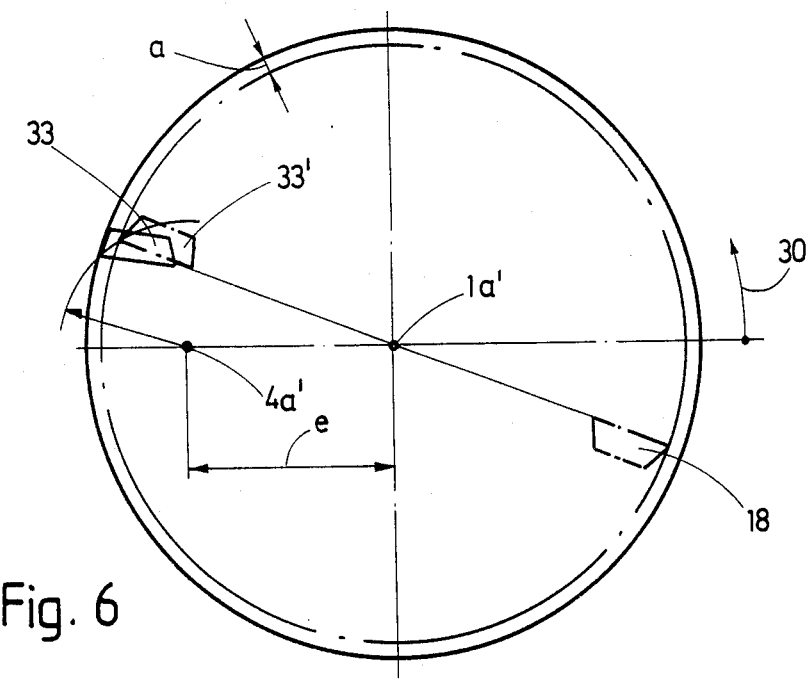
FIG. 6 is a view similar to FIG. 3, but for the bridge tool shown in FIGS. 4 and 5.

FIGS. 4 to 6 display another embodiment, in which the cutting blade 33, instead of being mounted on an eccentric sleeve, is mounted on a rocker 10 located eccentrically relative to the axis of rotation 1a' of the drilling tool 1'. The rocker 10, which pivots around the eccentric axle 4a', is fastened by a screw 35 to a cylindrical bearing piece 46 and held together with the latter on the drilling tool 1'. The tool 1' comprises a support 37 fixedly connected with a drive shaft 36, with downwardly projecting clamping jaws 42 and 38–39 being mounted on the support for the fastening of the rocker 10 as well as an additional cutting edge 18. The latter is clamped tightly between the two clamping jaws 38 and 39 by means of a clamping screw 40 acting on the cutting blade support 41, to which the plate-like cutting blade 18 is fastened. The outermost edge of the cutting blade 18 is located on a radius corresponding to the radius occupied by the outermost edge of the cutting blade 33 of the rocker 10 in its broken-line position 33'. This small-radius position corresponds, similarly to FIGS. 1 to 3, to rough cutting. In this position the right arm 10b of the rocker 10 is abutting against a surface 14 of the fastening jaw 42. In the solid-line position the cutting blade 33 is located on the larger radius, in which it is held by the effect of a helical compression spring 11 mounted in a bore 43 and biasing a pin 13 into contact with an adjusting screw 15 located on the jaw 44 opposing the jaw 42. The two arms 10a and 10 of the rocker 10 therefore extend between the two jaws 42 and 44. The left arm 10a of the rocker with the cutting edge 33 is spaced from the jaw 42 to form a recess 45 for the discharge of chips.

If desired, the spring 11 could be retained in bore 43 by a screw which could be adjusted in or out to vary the spring force. Similarly to the embodiment of FIGS. 1 to 3, a rotation of the tool 1' in the direction of the arrow 30 displaces the cutting blade 33 from a roughing cut position to a finish cut position. Rotation of the rocker depends upon the particular reaction forces applied to the blade. In that regard, the torque applied by the spring to the rocker 10 in the counterclockwise direction (i.e., in the direction of rotation 30) is larger than the finish reaction torque acting in the clockwise direction and generated by the cutting forces during finish cutting. The biasing torque applied to the rocker 10 is smaller than the roughing reaction torque acting during rough cutting in the clockwise direction. The rocker 10 then abuts with its arm 10b against the surface 14.

Figure 7:
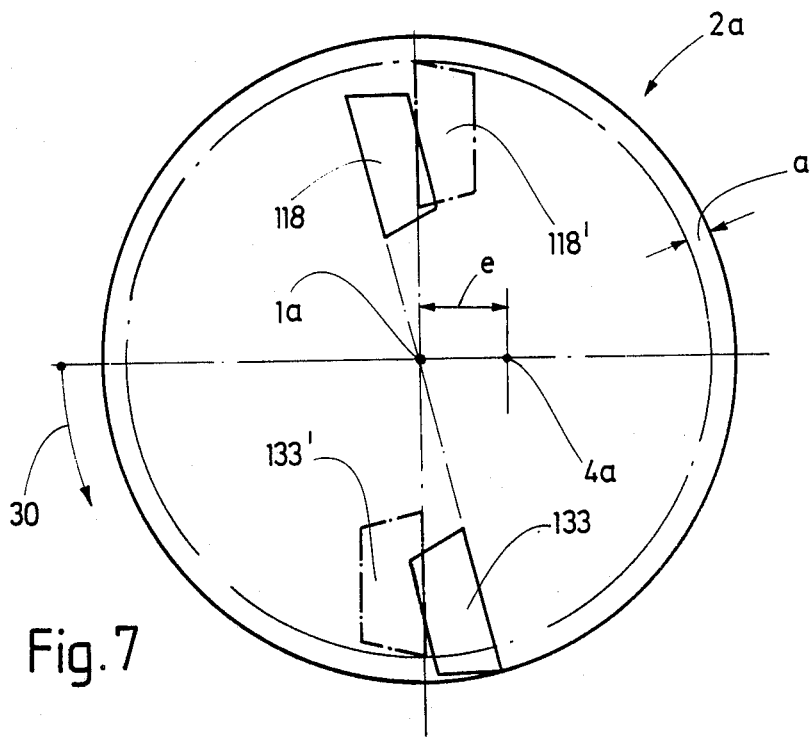
FIG. 7 is a view similar to FIG. 3, but for the bridge tool shown in FIGS. 4 and 5.

In FIG. 7, the conditions resulting from the mounting of two cutting blades 118 and 133 on a tool 2a are shown schematically, which tool essentially corresponds to the tool 2 of FIG. 1. As seen in FIG. 7, the two blades 118 and 133 are offset by 180° relative to each other. When the cutting edge 133 is brought ir the solid-line finish cutting position by the pivotin, the eccentric around the axle 4a, the second cutti edge 118 is moved to a smaller radius and thus does n. participate in finish cutting.

Figure 8:
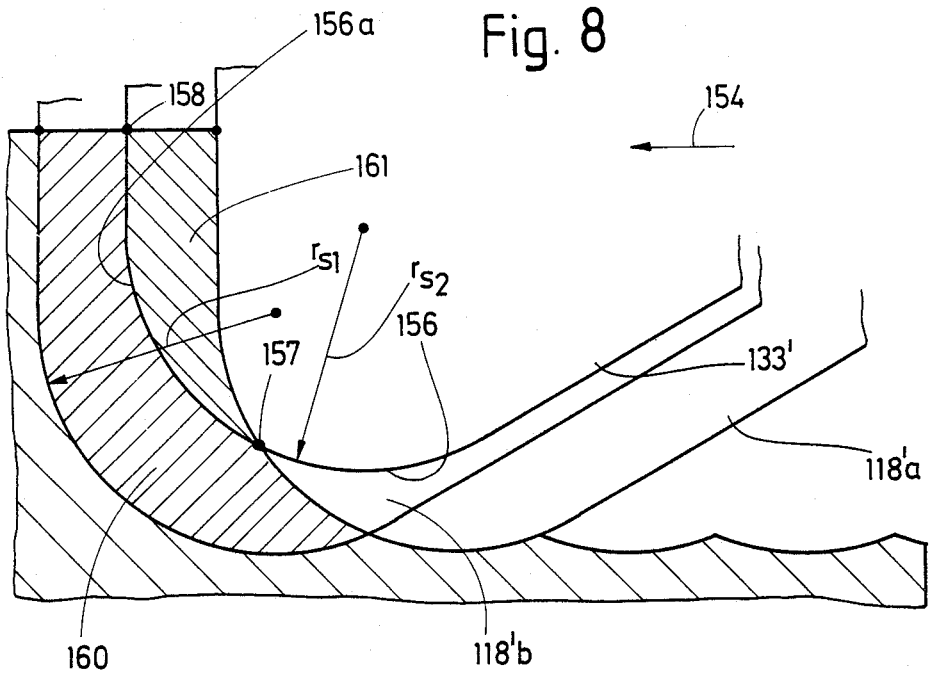
FIG. 8 is an enlarged and schematic view of the contact range of the cutting blades of FIG. 7 during rough machining.

During rough cutting, however, the two cutting blades 118 and 133 are located in broken-line positions 118' and 133' respectively. The cutting blade 133' is offset slightly radially inwardly relative to the blade 118' as seen in FIG. 8. The cutting blade 118', during the roughing advance is moved in the direction 154 (parallel to the axis of rotation) by one revolution from the position 118'a into the position 118'b and thereby removes the chip cross section 160. The blade 118 has its cutting corner radius $r_{S1}$ disposed radially farther out than the cutting edge corner radius $r_{S2}$ of the blade 133'. During the advance in the direction 154 therefore only a partial area of the cutting edge 156 of blade 133', i.e., the area between the points of attack 157 and 158, is being stressed. The remaining part of the cutting edge 156 only becomes effective later during the finishing step while in the position 133 (FIG. 7). Thus, the remaining part of the edge 156 is used in finish cutting only, whereby the cutting blade will last longer. The frequency of tool replacement is thus reduced. FIG. 7 further shows that the blade 118 is not used at all in the finish cutting process. The blade 118' performs, as set forth in connection with FIG. 8, the major part of rough cutting, while the blade 133' performs the minor part of rough cutting and all of the finish cutting.

Figure 9:
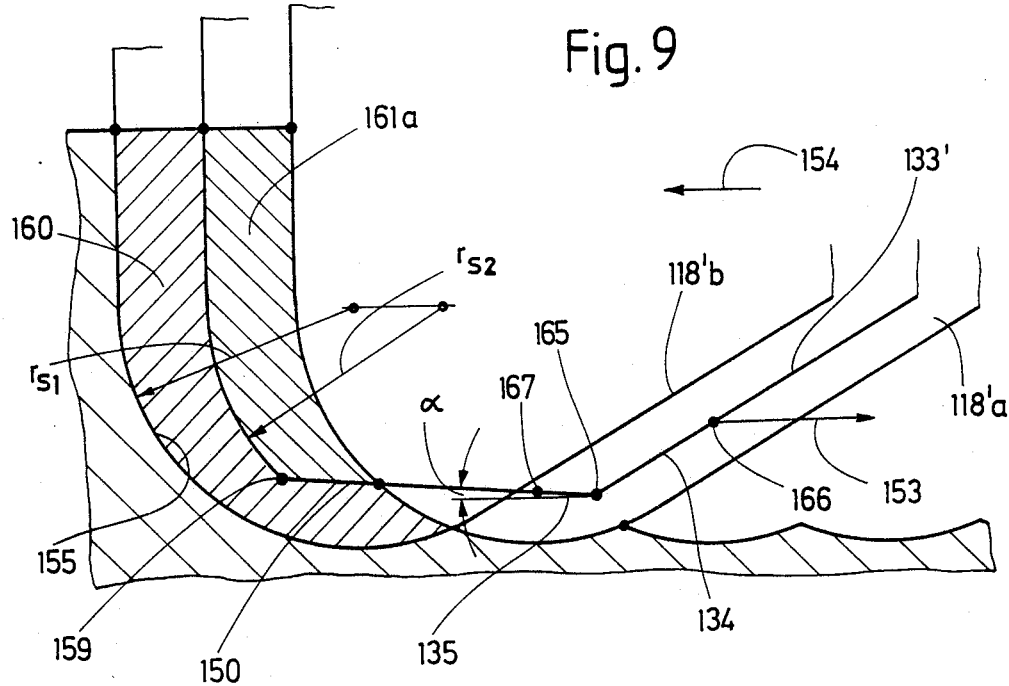
FIG. 9 is an enlarged view similar to FIG. 8, but with a different arrangement of the cutting blade used in the finishing process.

FIG. 9 shows a view similar to FIG. 8 of a modified configuration of the blade 133'. Here again, the cutting blade 118' cuts only in rough cutting as it advances in the direction 154 to remove the cross section 160, while the second cutting blade 133' removes only the cross section 161a, since the blade 133' is offset rearwardly. The cutting edge 134 of the bit 133' is modified in this embodiment to the extent that here the edge corner radius ($r_{S2}$) of the blade 133' extends only to the point 159. From here the cutting corner edge 150 is in the form of a straight line extending from point 159 to point 165 and rising at a slight angle ($\alpha$) relative to a plane parallel to the direction of advance 153 from point 165 on obliquely rearward to point 159. Due to this configuration the cutting edge of the blade 133' includes a straight finish cutting edge and, between the points 165 and 167, includes a side cutting edge 135. This region of the blade for finish cutting may be in the form of an edge as sharp as possible. For the rest, the arrangement may be the same as in the case of a known finish cutting blade. The rough cutting area at the point 159 may be rounded or provided with a bezel, as in conventional rough cutting.

In the configuration according to FIG. 9, it is not necessary, in contrast to the configuration shown in FIG. 7, to radially inwardly offset the cutting blade 133' relative to the blade 118' during rough cutting. The radial offsetting of the outer edge is obtained by the provision of the straight cutting edges 150. The advantage whereby the finish cutting edge 134 and the side edge 135 are actuated only during the return motion in the direction 153 but are entirely inactive during the rough cutting process. This is true in a similar manner for a tool for the working of cylindrical outer surfaces.

Although the present invention has been described in connection with preferred embodiments thereof, it will be appreciated by those skilled in the art that modifications, substitutions, additions and deletions not specifically described, may be made without departing from the spirit and scope of the invention as defined in the appended claims.

What is claimed is:

1. A tool for cutting workpieces comprising:
    a drill chuck rotatable about a first axis,
    a blade carrier mounted on said chuck for rotation therewith, and being rotatable relative to said chuck about an eccentric second axis such that said carrier is rotatable relative to said chuck between
    a first position wherein a blade mounted on said carrier is disposed at a first distance from said first axis for effecting a roughing cut as said tool is advance relative to the workpiece whereby said carrier is acted upon by a first reaction torque, and
    a second position wherein the blade is disposed at a second distance from said first axis for effecting a finishing cut as said tool is retracted relative to the workpiece wherein said carrier is acted upon by a second reaction torque weaker than said first reaction torque, and
    spring means on said chuck for biasing said carrier away from said first position toward said second position with a biasing torque greater than said second reaction torque but less than said first reaction torque, wherein said carrier is automatically spring biased to said second position in response to withdrawal of said tool relative to the workpiece.

2. A tool according to claim 1, further including means to adjust the strength of said spring means.

3. A tool accordingly to claim 1, wherein said chuck includes first and second stops for defining said first and second positions, respectively, of said carrier, said first and second stops including means to permit their adjustment.

4. A tool according to claim 3, wherein said first and second stops each comprise an adjustable screw threadedly mounted in said chuck.

5. A tool according to claim 1, wherein said second axis is parallel to said first axis, and said spring means comprises a helical spring arranged concentrically with said second axis.

6. A tool according to claim 1, wherein said carrier comprises a rocker having first and second arms projecting laterally of said second axis, said blade being mounted on said first arm.

7. A tool according to claim 6, wherein said spring means acts against said second arm.

8. A tool according to claim 7 wherein said chuck includes a bore extending perpendicularly relative to said first axis, said spring means comprising a helical compression spring disposed in said bore, and a pin biased by said spring against said second arm.

9. A tool according to claim 8, wherein said chuck includes a tool surface intersected by said bore, said tool surface defining a stop against which said second arm abuts when said rocker is in said first position.

10. A tool according to claim 9, including an adjustable stop mounted in said chuck opposite said tool surface and against which said second arm abuts when said rocker is in said second position.

11. A tool according to claim 1, including an additional blade mounted on said carrier in circumferentially spaced relationship to said first named blade, said additional blade arranged to be disposed in a non-cutting relationship when said carrier is in said second position and in a cutting relationship when said carrier is in said first position, said additional blade disposed radially inwardly relative to said first named blade when said carrier is in said second position, said additional blade disposed radially outwardly relative to said first named blade when said carrier is in said first position whereby only a portion of said first named blade cuts during a roughing cut.

12. A tool according to claim 11, wherein said additional blade includes a cutting edge having a rounded corner, and said first named blade includes a cutting edge having a substantially straight corner which is inclined relative to said first axis.

* * * * *